April 27, 1948.                    O. G. BLOCHER                    2,440,630
                                  SELF-LOCKING LEVER
                                   Filed June 21, 1946
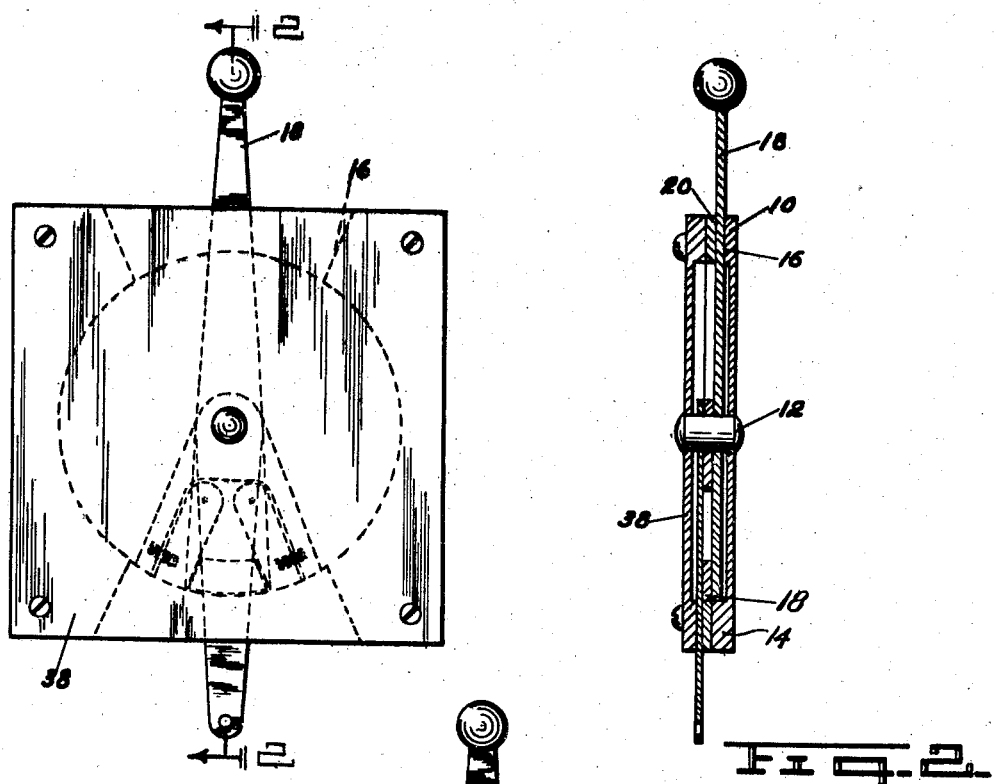
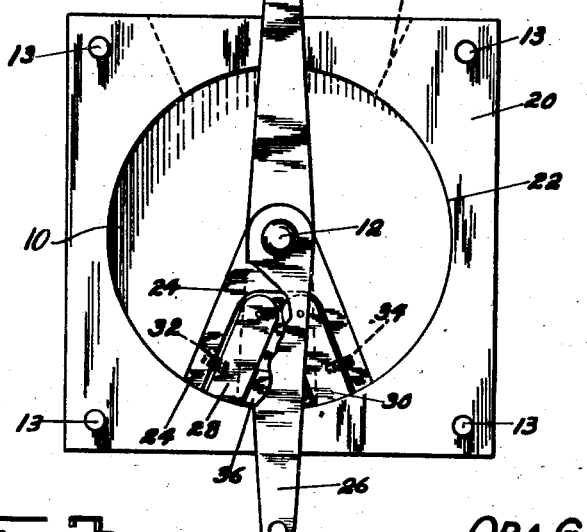
INVENTOR.
ORA G. BLOCHER
BY
ATTORNEY Patented Apr. 27, 1948

2,440,630

UNITED STATES PATENT OFFICE 2,440,630

SELF-LOCKING LEVER

Ora G. Blocher, Detroit, Mich., assignor to Bendix Aviation Corporation, Detroit, Mich., a corporation of Delaware Application June 21, 1946, Serial No. 678,197

4 Claims. (Cl. 192—8)

1

This invention relates to actuating mechanisms and more particularly to self-locking levers.

An object of the invention is to provide a lever which will automatically lock in position at any point within the operating limits.

Another object of the invention is to provide a lever mechanism which is extremely sensitive and responsive in its operation.

A further object of the invention is to provide a lever mechanism which is comparatively simple in design and structure.

A still further object of the invention is to provide a lever mechanism which is efficient, compact and comparatively cheap to produce.

Other objects and advantages of the invention will become apparent to those skilled in the art upon a consideration of the following detailed description composed with reference to the accompanying drawing in which:

Fig. 1 is a plan view of the self-locking mechanism taken with the cover plate in place;

Fig. 2 is an elevation view in half section taken substantially on line 2—2, and Fig. 3 is a plan view of the lever mechanism with the coverplate removed and a portion of lower arm cut away.

Referring to the drawing for more specific details of the invention, 10 represents a backing plate having a centralized fixed support 12, centrally spaced threaded openings 13, and a raised shoulder 14, extended around the entire periphery of the backing late 10. The shoulder has a milled section 16 to allow for the angular sweep of a primary lever 18 pivoted on the fixed support 12. A body member 20 has a circular opening therein, which provides an annular surface 22 concentrically disposed to the fixed support 12. Located within this circular opening of the body member 20 is a yoke 24 fixedly secured to the back of a secondary lever 26 pivoted on the fixed support 12, and extended beyond the body member 20 for cooperation with a throttle valve not shown.

Oppositely disposed dogs 28 and 30 are pivotally mounted on the secondary lever for cooperation with the arms of the yoke 24 and are adapted to engage the annular surface 22. The free ends of the dogs 28 and 30 are formed to the contour of the annular surface 22, and are held in pressing engagement therewith by coil springs 32 and 34.

A knock-out block 36 is fixedly secured to the force transmitting end of the primary lever 18 between the dogs 28 and 30 for operation therewith and to protect the operating mechanism, a cover plate 38, similar in construction to backing plate 10, is securely attached to the body member 20 by machine screws received by the threaded openings 13.

In operation, if a small counterclockwise force is applied to the primary lever 18 it is transmitted through the fixed support 12 to the knock-out block 36. The knock-out block 36 engages the inner face of dog 30 and forces it out of contact with the annular surface 22. The yoke 24 and the attached secondary lever 26 are now free to move in a counterclockwise direction upon the application of additional force.

When the secondary lever 26 has been positioned, and the actuating force removed, the coil spring 34 forces the disengaged pawl 30 back in contact with the annular surface 22. The axial thrust which the re-engaged pawl 30 exerts against the annular surface 22 locks the mechanism against any unintended movement in a counterclockwise direction. The oppositely disposed pawl 28 likewise prevents any unintended movement of the yoke 24 and secondary lever 26 in a clockwise direction.

The action of the two dogs 28 and 30, operating in combination with the annular surface 22, provides an actuating mechanism which will automatically lock in any position immediately upon removal of the operating force.

To effect a clockwise movement of the secondary lever 26, a clockwise force is applied to the primary lever 18. The resultant motion is then transmitted to the secondary lever 26 in a manner similar to that outlined for the counter-clockwise movement of the mechanism.

Although this invention was described with reference to the details of a particular modification, it must be appreciated that the principles involved are susceptible of numerous other applications which will become apparent to persons skilled in the art.

Having thus described the invention, what I desire to claim as new and secure by Letters Patent is:

1. A self-locking lever comprising a fixed support, a member associated therewith having an opening providing an annular surface concentric with the fixed support, a primary lever and a secondary lever each pivoted on the support, a yoke carried by the secondary lever, locking members on the secondary lever for cooperation with the annular surface and the yoke to lock the movement of the secondary lever, and a knock-out block on the force transmitting end of the primary lever for unlocking the locking members and actuating the secondary lever.

2. A self-locking lever comprising a fixed support, a member associated therewith having a circular opening concentrically disposed with relation to the fixed support, a primary lever and a secondary lever each mounted for rotation on the fixed support, a yoke carried by the secondary lever, dogs pivotally attached to the secondary lever, resilient means associated with the yoke and dogs to urge the latter into engagement with the defining wall of the opening to secure the secondary lever, and a knockout block carried force transmitting end of the primary lever for unlocking the dogs and moving the secondary lever.

3. A self-locking lever comprising a backing plate having a fixed support, a body member supported by the backing plate and having a circular opening concentrically disposed with relation to the fixed support, a primary lever and a secondary lever each mounted for rotation on the fixed support, a yoke carried by the secondary lever, dogs pivotally attached to the secondary lever for cooperation with the wall defining the circular opening, resilient members interposed between the yoke and the dogs to yieldingly move the latter into engagement with the wall defining the circular opening, and a knockout block carried on the force transmitting end of the primary lever for unlocking the pawls and actuating the secondary lever.

4. A self-locking lever comprising a backing plate having a fixed support, a body member associated with the backing plate and having a circular opening providing an annular surface concentric with the fixed support, a primary lever and a secondary lever each mounted for rotation on the fixed support, a yoke carried by the secondary lever, dogs pivotally attached to the secondary lever, and adapted for cooperation with the annular surface, resilient members interposed between the yoke and the dogs urging the latter into engagement with the annular surface and locking the movement of the secondary lever, and a knockout block carried on the force transmitting end of the primary lever for unlocking the dogs and actuating the secondary lever.

ORA G. BLOCHER.

REFERENCES CITED

The following references are of record in the file of this patent:

UNITED STATES PATENTS

| Number | Name | Date |
| --- | --- | --- |
| 657,244 | Liggett | Sept. 4, 1900 |
| 692,869 | Lemp | Feb. 11, 1902 |

FOREIGN PATENTS

| Number | Country | Date |
| --- | --- | --- |
| 384,026 | France | Jan. 23, 1908 |